United States Patent [19]
Ikegame et al.

[11] Patent Number: 5,428,481
[45] Date of Patent: Jun. 27, 1995

[54] OPTICAL SYSTEM SUPPORTING DEVICE

[75] Inventors: Tetsuo Ikegame; Ichiro Ikari, both of Hachioji, Japan

[73] Assignee: Olympus Optical Co., Ltd., Tokyo, Japan

[21] Appl. No.: 607,683

[22] Filed: Nov. 1, 1990

[30] Foreign Application Priority Data

Nov. 2, 1989 [JP] Japan .................. 1-285036

[51] Int. Cl.⁶ .......................... G02B 7/02; G11B 7/00; G11B 7/09
[52] U.S. Cl. ................ 359/811; 359/814; 359/824; 359/823; 369/44.16; 369/44.15
[58] Field of Search .......... 350/247, 252, 257; 369/44.11, 44.14–44.19; 359/813, 814, 823–824

[56] References Cited

U.S. PATENT DOCUMENTS

| | | | |
|---|---|---|---|
| 4,702,555 | 10/1987 | Iguma et al. | 359/814 |
| 4,766,583 | 8/1988 | Oinoue et al. | 350/247 |
| 4,861,138 | 8/1989 | Suzuki | 359/824 |
| 4,911,534 | 3/1990 | Henegouwen et al. | 350/255 |
| 4,922,477 | 5/1990 | Miura | 359/814 |
| 5,018,836 | 5/1991 | Noda et al. | 350/255 |
| 5,056,891 | 10/1991 | Masunaga | 369/44.15 |
| 5,073,883 | 12/1991 | Mitsunori | 359/814 |

FOREIGN PATENT DOCUMENTS

| | | | |
|---|---|---|---|
| 59-221839 | 12/1984 | Japan . | |
| 60-197942 | 10/1985 | Japan . | |
| 62-145539 | 6/1987 | Japan . | |
| 173641 | 7/1987 | Japan | 369/44.15 |
| 155429 | 6/1988 | Japan | 369/44.15 |
| 37733 | 2/1989 | Japan | 369/44.16 |
| 150732 | 6/1991 | Japan | 369/44.15 |

*Primary Examiner*—Loha Ben
*Assistant Examiner*—Thong Nguyen
*Attorney, Agent, or Firm*—Stevens, Davis, Miller & Mosher

[57] ABSTRACT

An optical system supporting device in which an optical system holding member is supported by springs to be movable in focusing and tracking directions; and each of the springs has at least one portion which is oriented parallel with a tangential direction and one bending portion which is bent toward an optical axis of the optical system. Therefore, the holding member is made small in width with respect to the tracking direction; and thus the holding member can be made light in weight such that the driving sensitivity of the holding member is improved.

14 Claims, 6 Drawing Sheets

FIG_1
PRIOR ART

FIG_2
PRIOR ART

FIG. 3

FIG_4

FIG_5

FIG_7A

FIG_7B

OPTICAL SYSTEM SUPPORTING DEVICE

BACKGROUND OF THE INVENTION

1) Field of the Invention

The present Invention relates to an optical system supporting device for use in an optical information recording apparatus in which the optical information is recorded on an information recording medium such as an optical disc and an optical card by illuminating a light beam thereon.

2) Prior Art Statement

When illuminating the light beam on the information recording medium in order to record the optical information thereon, a focusing control and a tracking control of the light beam are necessary with respect to tracks formed on the recording medium. For the purpose of the focusing and tracking control of the light beam, an objective lens, which is arranged at an opposite side of the recording medium, should be smoothly moved in a focusing direction and a tracking direction.

Figure 1:
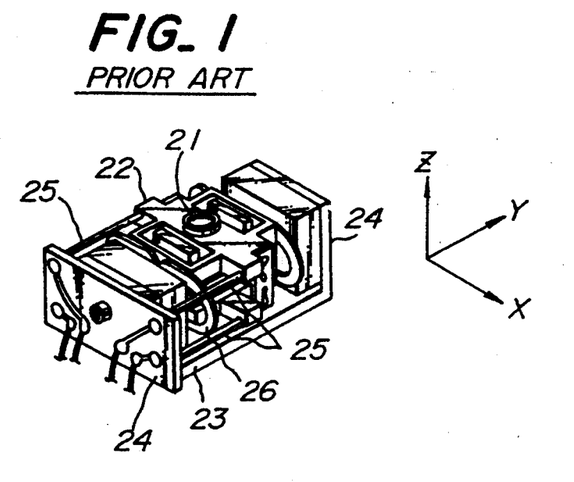
FIGS. 1 and 2 are schematic perspective views showing conventional optical system supporting devices, respectively.

The objective lens is supported by a lens holder, i.e. an optical system supporting device; and the movement thereof is conducted by moving the lens holder in the focusing and tracking directions. Such optical system supporting device is, for instance, disclosed in Japanese Patent Preliminary Publication No. 59-221839. FIG. 1 is a schematic perspective view showing the optical system supporting device disclosed in this publication. An objective lens 21 is held in an objective lens holder 22; and the lens holder 22 is arranged on a base plate 23. At both sides of the base plate 23 in a tangential direction, are arranged fixing members 24, 24. It should be noted that in this specification a tracking direction is represented by X direction, a tangential direction by Y direction and a focusing direction by Z direction, hereinafter. On inner walls of these fixing members 24, 24, magnets are provided, respectively. Between one of the fixing members 24 and the lens holder 22, four metal wires 25 are extended in parallel with Y direction. The wires 25 are arranged parallel to each other; and each end of these wires is secured to the fixing member 24 and the lens holder 22. Therefore, the lens holder 22 is supported by the wires 25 so as to be movable in the focusing and tracking directions.

Figure 2:
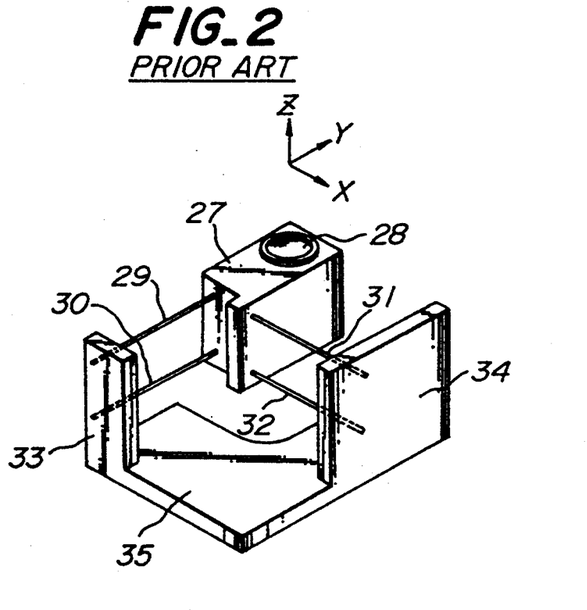

In Japanese Patent Preliminary Publication No. 60-197942, there is disclosed another optical system supporting device. FIG. 2 is a perspective view depicting a structure of this device. In this device, the lens holder 27 holding an objective lens 28 therein is supported by four metal wires 29, 30, 31 and 32. As shown in FIG. 2, the wires 29 and 30 are extended in the Y direction, and the wires 31 and 32 are extended in the X direction; and one end of each wire is fixed to fixing members 33 and 34 arranged on a base plate 35. In this device, the lens holder 27 is also arranged to be movable in the focusing and tracking directions.

A critical commercial demand of an optical information recording apparatus having such optical system supporting device is that it be made small in size. Therefore, the optical system supporting device is also required to be made small in size. Further, in the optical information recording apparatus, it is required to expand a range over which the information can be recorded on the recording medium and the information recorded thereon can be read out therefrom. In order to expand the recording/reproducing range, the size of the supporting device in the tracking direction particularly should be made small.

However, in the conventional device shown in FIG. 1, there are provided tracking coils 26 at both sides in the Y direction of the lens holder 22; and the wires 25 are arranged outside one of the tracking coils 26 straightly. Therefore, the width of the lens holder 22 in the Y direction is determined according to the width of the tracking coil 26 and thus the width of the lens holder can not be made small. It may be suggested to bend the tracking coil 26 into an L shape in order to make the width of the lens holder 22 small, but a number of assembling processes of the pick up device would be increased.

On the other hand, the conventional device denoted in FIG. 2, succeeds in making the width (in the X direction) of the lens holder 27 per se small, so that the lens holder 27 can be arranged in the vicinity of a spindle motor (not shown), which is provided for driving the pick up device as a whole. However, between the lens holder 27 and the fixing member 34, there are extended the metal wires 31 and 32 in the X direction, and thus the size in the X direction of the device as a whole becomes large. The information recording medium is generally stored in a cartridge, and in the cartridge, there is provided an opening for passing a light beam therethrough. Therefore, when the lens holder 27 is moved in the X direction, the fixing member 34 makes contact with the opening of the cartridge, so that recording and read out of information at an outer portion of the recording medium could not be conducted.

SUMMARY OF THE INVENTION

The present invention has for its purpose to provide an optical system supporting device in which the width in the tracking direction can be made small. Therefore, the optical information recording apparatus having the optical system supporting device according to the invention can be made small in size as a whole; and it is possible to record information even at an outer portion of the recording medium and to read out information recorded thereat.

In order to carry out the above mentioned purpose, the optical system supporting device according to invention comprising:

holding means for holding an optical system;
driving means for driving said holding means in focusing and tracking directions;
supporting means for supporting said holding means to be movable in the focusing and tracking directions, comprising at least a couple of supporting members for supporting said holding means;
a base plate for carrying said holding means, driving means and supporting means; and
each of said supporting members comprising at least one parallel portion being in parallel with a tangential direction and one bending portion being bent toward an optical axis of said optical system, and these parallel portions and the bending portion being formed in series as a single unit.

In the optical system supporting device according to the invention, the supporting means for supporting the lens holder, i.e. the optical system holding means, comprises a bending portion which is bent toward the optical axis of the optical system. Therefore, it is possible to make the width in the X direction of the lens holder small.

DETAILED DESCRIPTION OF THE PREFERRED EMBODIMENT

Figure 3:
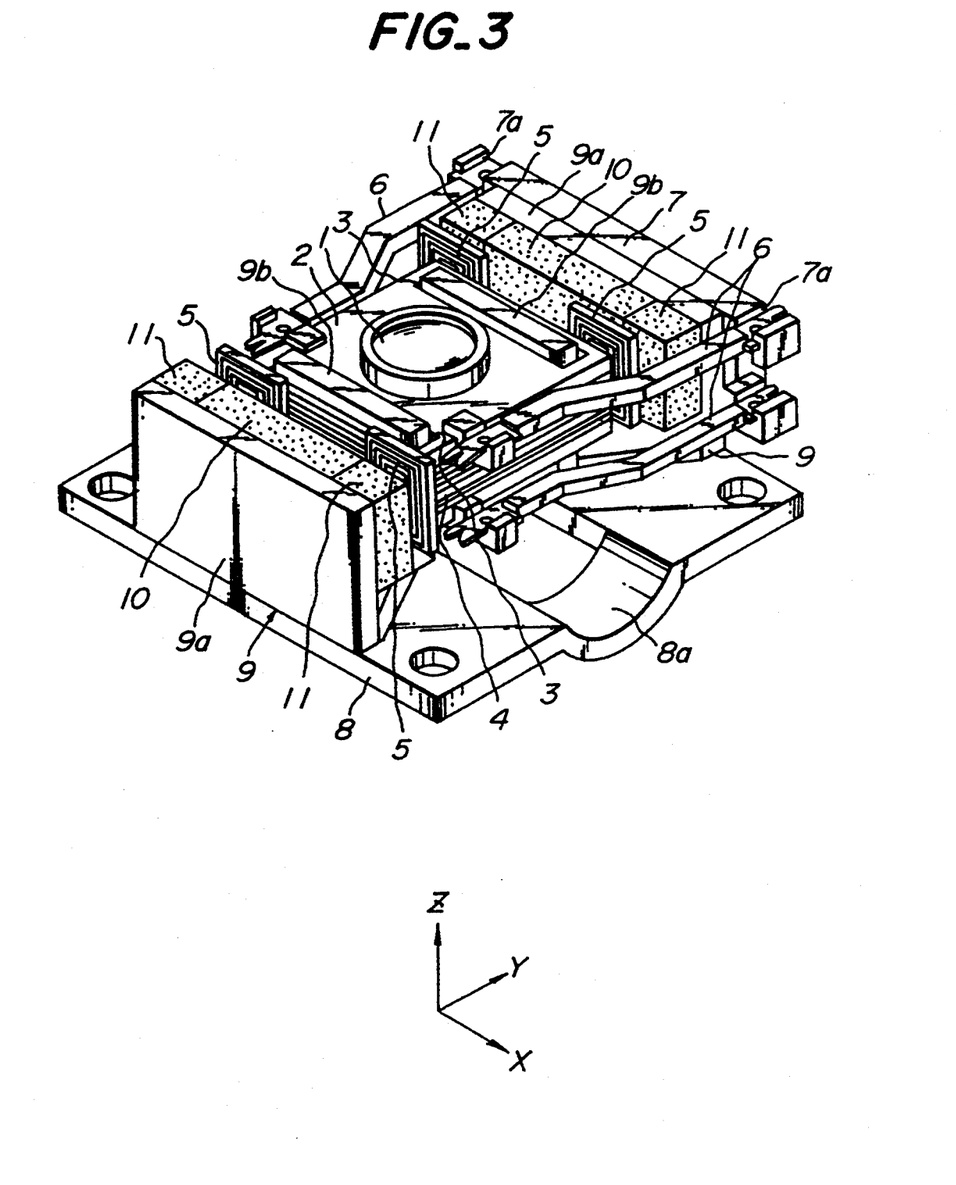
FIG. 3 is a schematic perspective view illustrating a first embodiment of the optical system supporting device according to the invention.
Figure 4:
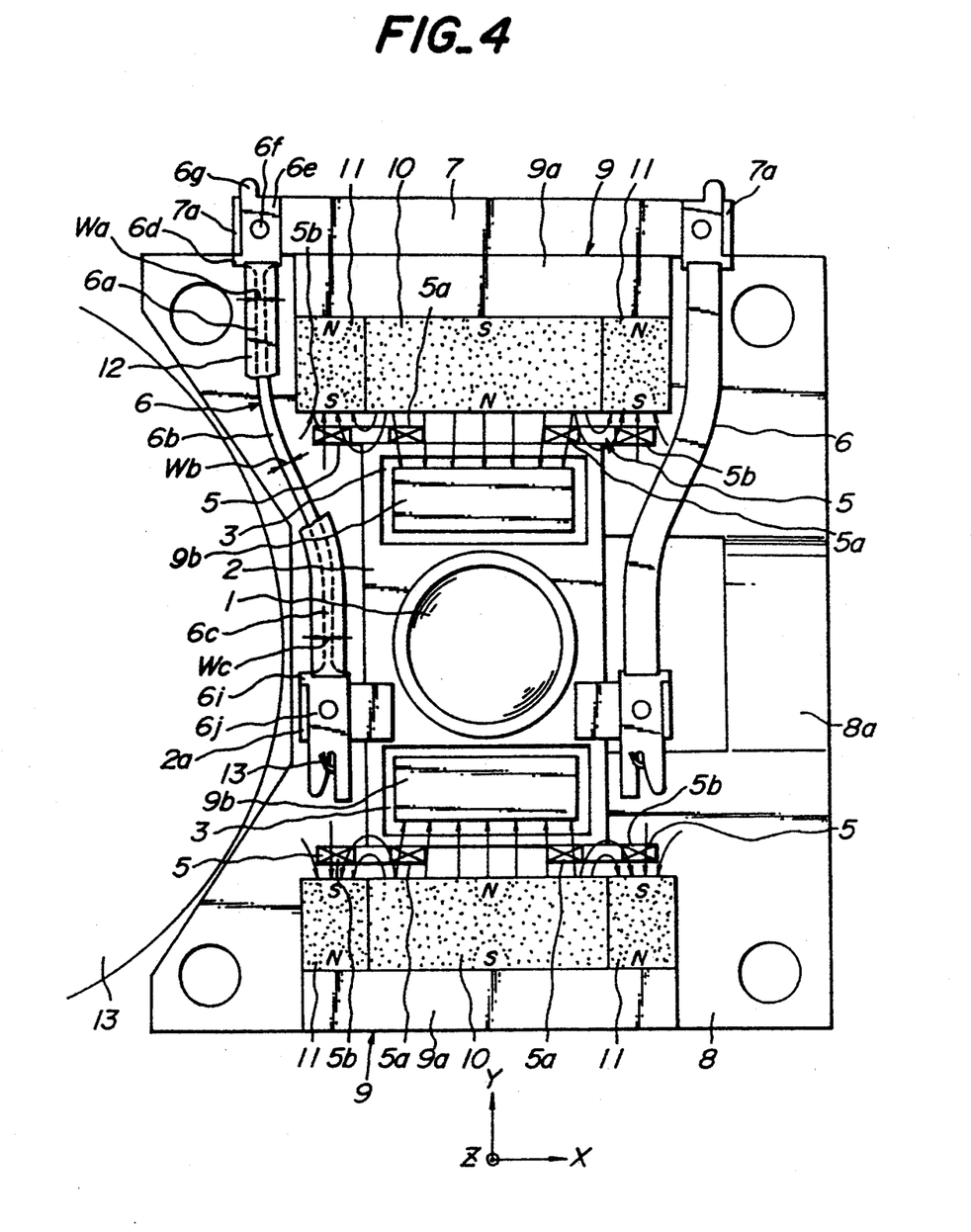
FIG. 4 is a schematic plan view depicting the first embodiment of the optical system supporting device shown in FIG. 3.
Figure 5:
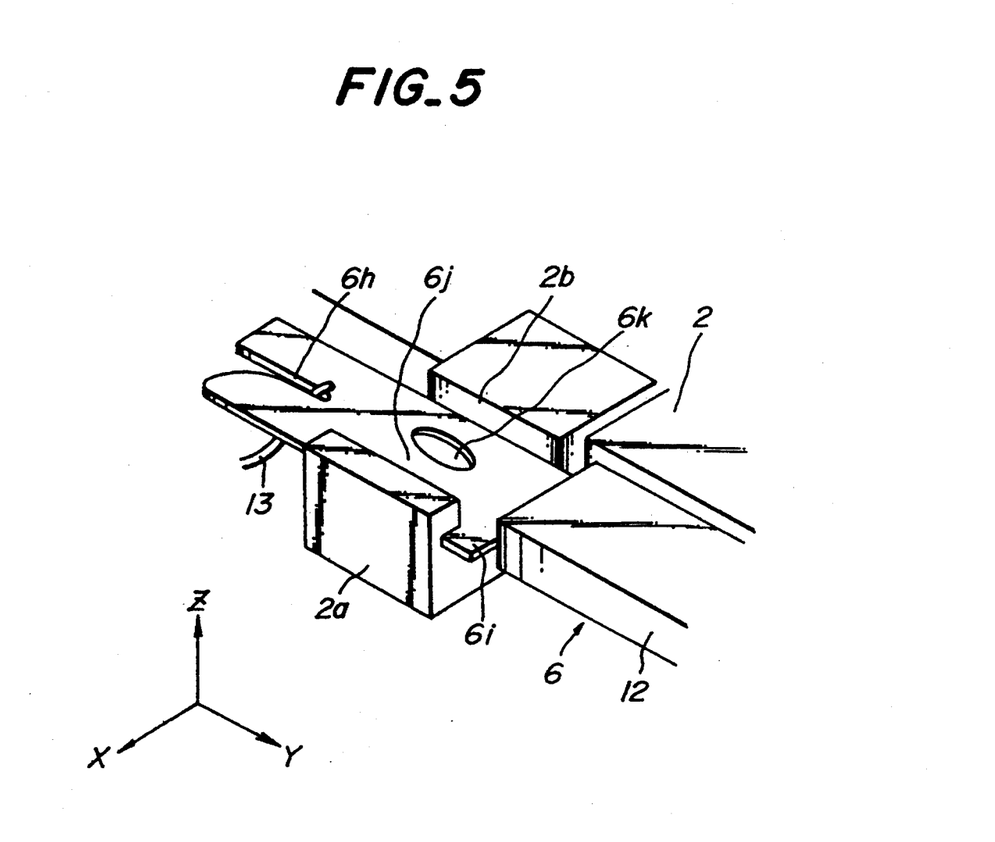
FIG. 5 is a partial perspective view representing a connecting portion between the supporting means and the lens holder.

FIGS. 3 to 5 are schematic views showing the first embodiment of the optical system supporting device according to the invention.

An objective lens 1 is arranged in an objective lens holder 2; and around a side wall of the lens holder 2 is wound a focusing coil 4. At both sides in a tangential direction of the lens holder 2 are mounted four tracking coils 5. A base plate 8 is formed by pressing and in a center portion of the base plate 8, is formed a concave portion 8a through which a light beam can be passed. On the base plate 8, there are provided a couple of outer yokes 9a, 9a and a couple of inner yokes 9b, 9b extending in parallel with said concave portion 8a in the X direction. The inner yokes 9b, 9b are positioned in openings 3 and 3 arranged in the lens holder 2. On inner walls of both the outer yokes 9a, 9a, there are provided three magnets 10, 11, 11, respectively. The center magnet 10 is sandwiched by the side magnets 11, 11 and the polarity of the center magnet 10 is magnetized in an opposite manner to that of the side magnets 11, 11.

At one side of the base plate 8 in the Y direction, there is provided a fixing member 7. Four springs 6 are extended from the fixing member 7 to the lens holder 2 such that the lens holder 2 is supported by the springs 6 so as to be movable in the X and Z directions. The springs 6 are formed by etching a thin plate of beryllium copper having a thickness of about 0.1 mm. As illustrated in FIG. 4, the springs 6 are covered by dampers 12 made of butyl rubber.

FIG. 5 depicts a connecting portion between the spring 6 and the lens holder 2. A projection 2a for arranging an end of the spring 6 is provided at a predetermined portion of the lens holder 2; and in the projection 2a there is provided a concave portion 2b. The concave portion 2b is engaged with the end 6j of said spring 6; and the end 6j is secured thereto by means of an agent. At the end portion 6j of the spring 6, there is provided a hole 6k through which said agent is sunk into a space formed between the spring 6 and the projection 2a, so that the spring 6 is engaged with the projection 2a in a fixed manner. In the end portion 6j of the spring 6, there is provided a small projection 6i. The movement in the Y direction of the spring 6 is limited by means of the projection 6i and the position of the spring 6 in the Y direction is determined by the engagement of the end portion 6j of the spring 6 with the projection 2a of the lens holder 2. Therefore, the position of the spring 6 can be determined easily and correctly without using a special positioning member, Further, in the end portion 6j, there is provided a notch portion 6h to which a terminal 13 of the focusing coil 4 or the tracking coil 5 is connected by means of a soft solder. Since the terminal 13 is firstly held by the notch 6h and then the terminal 13 is secured thereto by the soft solder, the terminal 13 is secured to the spring 6 in an efficient manner.

As shown in FIG. 4, at both ends of said fixing member 7 there are provided concave portions 7a, 7a into which the other ends 6e, 6e of the spring 6 are fixed. It should be noted that in the other end 6e of the spring 6, the numeral number 6d represents a projection for determining the position of the spring 6, and 6f a hole for sinking the adhesive agent. In each of the other ends 6e of the springs 6, there is further provided projection 6g. The projection 6g is secured to a land of a print substrate (not shown) by means of a soft solder in order to supply an electric current to the focusing coil 4 and the tracking coil 5 via the springs 6.

Each spring 6 comprises a first parallel portion 6a arranged in parallel with the tangential direction, a bending portion 6b bent toward an optical axis of the objective lens 1 and a second parallel portion 6c parallel with the tangential direction. It should be noted that these parallel and bending portions are formed in series. Because the bending portion is bent toward the optical axis of the optical system and the second parallel portion 6c is arranged at a side of the objective lens 1, a distance between the second parallel portions 6c and 6c is the shortest in comparison with the distance between the first parallel portions 6a and 6a and the distance between the bending portions 6b and 6b. That is to say, the second parallel portions 6c and 6c are closest to the objective lens 1. As shown in FIG. 3, two springs 6 are provided at each end portion of the fixing member 7, respectively, in the Z direction; and the springs 6 and 6 arranged in the lower positions have the same structure as those of the springs 6 and 6 arranged in the upper positions. The lens holder 2 is supported by these four springs movably in the X and Z directions.

In accordance with the optical system lens holder of the invention, the width in the X direction of the lens holder can be made small. Therefore, a space formed in the vicinity of the objective lens 1 becomes large so that a spindle motor (not shown) having a large diameter can be used. Further, it is possible to arrange a sensor for detecting a position of the lens holder 2 in the X direction in the space. Furthermore, since the distance between the second parallel portions 6c, 6c of the springs 6, 6 is arranged to be narrower than the distance between the first parallel portions 6a, 6a, a stiffness of the springs 6 with respect to a rotation of the lens holder about the Y axis can be increased in comparison with the springs all portions of which are arranged in straight manner.

In the first embodiment, as shown in FIG. 4, the numerical references $W_a$, $W_b$ and $W_c$ represent the widths in a direction perpendicular to the extending direction of each portion of the springs 6. The numerical reference $W_a$ represents the width of the first parallel portion 6a, $W_b$ the bending portion 6b and $W_c$ the second parallel portion 6c, respectively. Additionally each spring 6 is arranged such that the width $W_a$ of the first parallel portion 6a is equal to the width $W_c$ of the second parallel portion 6c and the width $W_b$ of the bending portion 6b is larger than the widths $W_a$ and $W_c$. For instance, it may be arranged that the widths $W_a$ and $W_c$ are about 0.3 mm, respectively, and the width $W_b$ is about 0.5 mm. The thickness of each spring 6 in Z direction is uniform at all portions. By such arrangement, the stiffness of the springs with respect to the rotations of the lens holder 2 about the X and Y axes and the stiffness of the springs in Y direction are increased. Therefore, it is possible to prevent that the optical axis of the objective lens 1 is inclined and possible to make a resonance frequency of the objective lens high.

In the plan view shown in FIG. 4, magnetic fluxes, which work with the tracking coil 5 and the focusing coil 4, are indicated. A magnetic flux generated by the magnet 10 goes through one side 5a of the tracking coil 5, further goes to the inner yoke 9b via the focusing coil 4. On the other hand, a magnetic flux generated by the magnet 11 goes through the other edge 5b of the tracking coil 5, in an opposite direction to the magnetic flux generated by the magnet 10. Therefore, the position of the optical beam illuminated on the track formed on the recording medium can be controlled by supplying a given electric current to the focusing coil 4 and the tracking coil 5.

As stated above, in the first embodiment, flat-shaped tracking coils 5 are secured on the side portions of the lens holder in the tangential direction. Therefore, the size of the optical system driving device in the tangential and tracking directions can be made small. The magnetic flux which works with the focusing coil 4 does not give damage to a driving sensitivity of the lens holder 2. It should be noted that three magnets are arranged at both inner walls of the outer yokes 9a, 9a, respectively, but it may be possible to arrange only on magnet magnetized in a multiple manner for the three magnets.

Figure 6:
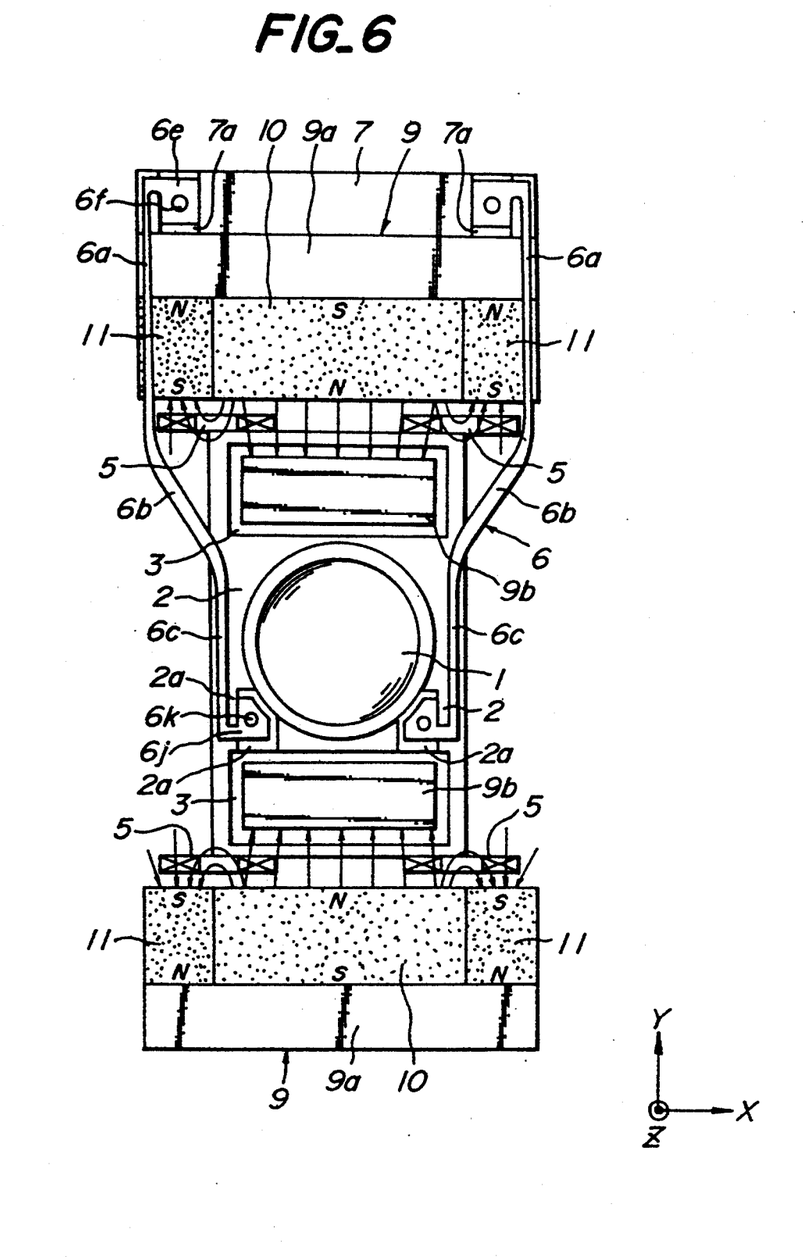
FIG. 6 is a schematic plan view showing a second embodiment of the optical system supporting device according to the invention.

FIG. 6 is a plan view showing the second embodiment of the optical system supporting device. In FIG. 6, the portions corresponding to the first embodiment are denoted by the same numerical references.

The one end portion 6j of the spring 6 is engaged with the projection 2a provided in the lens holder 2, and the end portion 6j is fixed to the projection 2a by means of an agent. On the other hand, the other end portion 6e of the spring 6 is fixed to the concave portion 7a provided in the fixing member 7 in the same manner. As clear from FIG. 6, both of the end portions 6j and 6e of the springs 6 are formed to be hook-shaped toward the inner side. Additionally the projections 2a of the lens holder 2 are projected to the Z direction. Therefore, it is possible to make the size of the lens holder 2 in the X direction smaller. It should be noted that, in FIG. 6, there is no indication of damper 12 in order to make the figure simple. Although there is no indication of the springs arranged in the lower position, the lens holder 2 and the magnets 11 are put between the respective two springs 6 arranged in the upper and lower positions of the device.

In such structure of the springs 6 according to the second embodiment, the effective lengths of the springs 6, which are bent in the X and Z directions, can be made long. Therefore, when the lens holder 2 is deviated in the X direction, the deviation amount thereof in the Y direction becomes small. And, as stated above, in the second embodiment, the projections 2a are not projected in the X direction but in the Z direction, and thus the lens holder 2 can be formed small in size and light in weight. Therefore, the driving sensitivity of the holding member 2 is increased and the moment of inertia about the Y axis thereof becomes small. Thus the resonance frequency is elevated. Further, it is possible to efficiently prevent resonance in the projections 2a themselves.

Figure 7A:
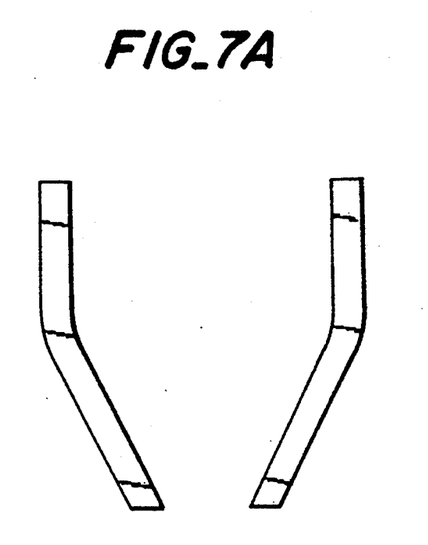
FIGS. 7A and 7B are schematic views illustrating variations of the supporting means for supporting the lens holder according to the invention.
Figure 7B:
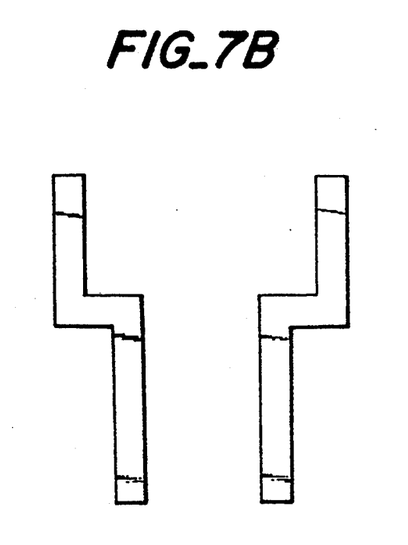

The present invention is not limited to the above explained embodiments and several modifications or variations can be applied thereto. For example, the springs 6 may be arranged in shapes as shown in FIGS. 7A and 7B. That is to say, the springs 6 may have their shapes such that each has only one parallel portion and one bending portion as shown in FIG. 7A; and such that each has two parallel portions and one bending portion but the bending portion is bent at a right angle as shown in FIG. 7B.

In the present invention, the driving means for driving the lens holder 2 is not limited. Further, the present invention can be applied to a lens holder which is driven only in the focusing direction.

As stated above, according to the present invention, the optical system holding member, i.e. lens holder 2 is supported by springs each having a bending portion bent toward the optical axis of the optical system. Thus, it is possible to make the size of the holding member small in the tracking direction. Since the weight of the holding member also becomes light, the driving sensitivity of the holding member can be increased. Further, since the supporting member, i.e. springs, comprises the bending portion, the holding member is not affected by a resonance mode of the springs so much.

Furthermore, since the size of the lens holder in the tracking direction can be made small, the lens holder can move in a wide range so that it is possible to write in and read out the information on and from the information recording medium in a wide range. Moreover, the space formed at both sides of the lens holder becomes large, and then it is possible to arrange the spindle motor having a large diameter and a high efficiency in this space.

What is claimed is:

1. An optical system supporting device comprising:
   holding means for holding an optical system;
   driving means for driving said holding means selectively in a focusing direction, a tracking direction and a direction which is a combination of said focusing direction and said tracking direction;
   supporting means for supporting said holding means to be movable selectively in the focusing direction, the tracking direction and a direction which is a combination of said focusing direction and said tracking direction and comprising at least a first supporting member and a second supporting member for supporting said holding means;
   a base plate carrying said holding means, said driving means and said supporting means; and
   each of said first supporting member and said second supporting member comprising at least one parallel portion having a longitudinal axis oriented parallel to a tangential direction, said tangential direction extending perpendicular to both said tracking direction and said focusing direction, and one bending portion which (i) is serially connected to said parallel portion and (ii) has a longitudinal axis which (a) forms an angle with said longitudinal axis of said parallel portion, (b) is oriented in a direction substantially perpendicular to said focusing direction and (c) extends toward an optical axis of said optical system, said parallel portion and said bending portion being formed as a single unit, said parallel portion including a first end portion connected to said holding means, said bending portion and said first end portion being spaced apart from one another with respect to said tangential direction.

2. An optical system supporting device according to claim 1, wherein:
said first and second supporting members are arranged symmetrically on opposite sides of said holding means.

3. An optical system supporting device according to claim 2, wherein:
said base plate comprises at least a first fixing member for fixing said first end portion of each of said first and second supporting members; said holding means comprises at least a couple of second fixing members for fixing a second end portion of each of said first and second supporting members;
whereby said first and second supporting members are extended between the first fixing member and the second fixing member.

4. An optical system supporting device according to claim 1, wherein:
said supporting means comprises one parallel portion and one bending portion bent toward the optical axis of the optical system.

5. An optical system supporting device according to claim 1, wherein:
said bending portion is are bent toward the optical axis of the optical system at a right angle.

6. An optical system supporting device according to claim 1, wherein:
said first and second supporting members are provided in respective upper and lower positions of said supporting means.

7. An optical system supporting device according to claim 1, wherein said first end portion is positioned entirely on one side of an imaginary line that extends (a) in said tracking direction and (b) through said optical axis and said end portion is positioned entirely on the opposite side of said line.

8. An optical system supporting device comprising:
holding means for holding an optical system;
driving means for driving said holding means selectively in a focusing direction, a tracking direction and a direction which is a combination of said focusing direction and said tracking direction;
supporting means for supporting said holding means to be movable selectively in the focusing direction, the tracking direction and a direction which is a combination of said focusing direction and said tracking direction and comprising at least a first supporting member and a second supporting member for supporting said holding means;
a base plate carrying said holding means, said driving means and said supporting means; and
each of said first supporting member and said second supporting member comprising at least one parallel portion oriented parallel to a tangential direction and one bending portion which extends toward an optical axis of said optical system, said parallel portion and said bending portion being formed as a single unit, wherein:
said first and second supporting members are arranged symmetrically on opposite sides of said holding means;
said base plate comprises at least a first fixing member for fixing a first end portion of each of said first and second supporting members;
said holding means comprises at least a couple of second fixing members for fixing a second end portion of each of said first and second supporting members;
whereby said supporting members are extended between the first fixing member and the second fixing member;
said first fixing member comprises concave portions at both ends thereof, respectively, to which said first end portion of each of said first and second supporting members are fixed; and
said couple of second fixing members comprise projections, respectively, to which said second end portion of each of said first and second supporting members are fixed.

9. An optical system supporting device according to claim 8, wherein:
said supporting means is arranged such that a width in a direction perpendicular to extending directions of said bending portion is larger than a width of said parallel portion direction.

10. An optical system supporting device according to claim 8, wherein:
said concave portions are arranged in inner sides of said fixing members; and said projections are arranged in the focusing direction.

11. An optical system supporting device according to claim 10, wherein:
both ends of said supporting first and second members comprise hook-shaped portions which are hooked toward an inner side.

12. An optical system supporting device comprising:
holding means for holding an optical system;
driving means for driving said holding means selectively in a focusing direction, a tracking direction and a direction which is a combination of said focusing direction and said tracking direction;
supporting means for supporting said holding means to be movable selectively in the focusing direction, the tracking direction and a direction which is a combination of said focusing direction and said tracking direction and comprising at least a first supporting member and a second supporting member for supporting said holding means;
a base plate carrying said holding means, said driving means and said supporting means; and
each of said first supporting member and said second supporting member comprising at least one parallel portion having a longitudinal axis oriented parallel to a tangential direction, said tangential direction extending perpendicular to both said tracking direction and said focusing direction, and one bending portion which (i) is serially connected to said parallel portion and (ii) has a longitudinal axis which (a) forms an angle with said longitudinal axis of said parallel portion, (b) is oriented in a direction substantially perpendicular to said focusing direction and (c) extends toward an optical axis of said optical system, said parallel portion and said bending portion being formed as a single unit, wherein:
said supporting means comprises two parallel portions and one bending portion, and said bending portion is arranged between said parallel portions in series.

13. An optical system supporting device comprising:

holding means for holding an optical system;

driving means for driving said holding means selectively in a focusing direction, a tracking direction and a direction which is a combination of said focusing direction and said tracking direction;

supporting means for supporting said holding means to be movable selectively in the focusing direction, the tracking direction and a direction which is a combination of said focusing direction and said tracking direction and comprising at least a first supporting member and a second supporting member for supporting said holding means;

a base plate carrying said holding means, said driving means and said supporting means; and each of said first supporting member and said second supporting member comprising at least one parallel portion having a longitudinal axis oriented parallel to a tangential direction, said tangential direction extending perpendicular to both said tracking direction and said focusing direction, and one bending portion which (i) is serially connected to said parallel portion and (ii) has a longitudinal axis which (a) forms an angle with said longitudinal axis of said parallel portion, b) is oriented in a direction substantially perpendicular to said focusing direction and (c) extends toward an optical axis of said Optical system, said parallel portion and said bending portion being formed as a single unit, wherein said first and second supporting members are arranged symmetrically on opposite sides of said holding means, said base plate comprises at least a first fixing member for fixing a first end portion of each of said first and second supporting members; said holding means comprises at least a couple of second fixing members for fixing a second end portion of each of said first and second supporting members, whereby said first and second supporting members are extended between the first fixing member and the second fixing member, and said first end portion of each of said first and second supporting members comprises a stopper member, respectively, to determine positions in the tangential direction of said first and second supporting members.

14. An optical system supporting device comprising:
p1 holding means for holding an optical system;
driving means for driving said holding means selectively in a focusing direction, a tracking direction and a direction which is a combination of said focusing direction and said tracking direction;

supporting means for supporting said holding means to be movable selectively in the focusing direction, the tracking direction and a direction which is a combination of said focusing direction and said tracking direction and comprising at least a first supporting member and a second supporting member for supporting said holding means;

a base plate carrying said holding means, said driving means and said supporting means; and each of said first supporting member and said second supporting member comprising at least one parallel portion having a longitudinal axis oriented parallel to a tangential direction, said tangential direction extending perpendicular to both said tracking direction and said focusing direction, and one bending portion which (i) is serially connected to said parallel portion and (ii) has a longitudinal axis which (a) forms an angle with said longitudinal axis of said parallel portion, (b) is oriented in a direction substantially perpendicular to said focusing direction and (c) extends toward an optical axis of said optical system, said parallel portion and said bending portion being formed as a single unit, wherein said first and second supporting members are arranged symmetrically on opposite sides of said holding means, said base plate comprises at least a first fixing member for fixing a first end portion of each of said first and second supporting members and said holding means comprises at least a couple of second fixing members for fixing a second end portion of each of said first and second supporting members, whereby said first and second supporting members are extended between the first fixing member and the second fixing member, said driving means comprises at least a couple of magnets, a first coil member and a second coil member;

said supporting means serves as electric current supply means for supplying an electric current to said first and second coil members;

said first end portion of each of the first and second supporting members comprises a projecting portion by which said first and second supporting members respectively are connected to an electric current supply; and said second end portion of each of the first and second supporting members comprises notch portions to which terminals of said first and second coil members are connected.

* * * * *